(12) United States Patent
Nakanelua et al.

(10) Patent No.: US 11,468,214 B2
(45) Date of Patent: *Oct. 11, 2022

(54) METHOD AND SYSTEM FOR DETERMINING OPTIMAL PATHWAYS FOR INSTALLING CABLES IN AN INFRASTRUCTURE

(71) Applicant: CyberSecure IPS, LLC, Austin, TX (US)

(72) Inventors: Bobby Nakanelua, Elizabethtown, KY (US); Scott Rye, Upper Marlboro, MD (US); Stephen Sohn, Clarksburg, MD (US)

(73) Assignee: CyberSecure IPS, LLC, Prince Frederick, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,332

(22) Filed: Jun. 2, 2021

(65) Prior Publication Data

US 2021/0286916 A1 Sep. 16, 2021

Related U.S. Application Data

(63) Continuation of application No. 16/787,355, filed on Feb. 11, 2020, now Pat. No. 11,036,899.

(51) Int. Cl.
| | | |
|---|---|---|
| *G06F 30/18* | (2020.01) | |
| *G06F 30/12* | (2020.01) | |
| *G06F 30/27* | (2020.01) | |
| *G06F 3/04847* | (2022.01) | |
| *G06T 7/62* | (2017.01) | |
| *G06F 3/04842* | (2022.01) | |
| *G06F 113/16* | (2020.01) | |

(52) U.S. Cl.
CPC .......... *G06F 30/18* (2020.01); *G06F 3/04842* (2013.01); *G06F 3/04847* (2013.01); *G06F 30/12* (2020.01); *G06F 30/27* (2020.01); *G06T 7/62* (2017.01); *G06F 2113/16* (2020.01)

(58) Field of Classification Search
None
See application file for complete search history.

(56) References Cited

U.S. PATENT DOCUMENTS 8,583,363 B2 * 11/2013 Abraham ................ G01C 21/34
701/417
10,460,589 B1 * 10/2019 Srinivasan ........... H05K 7/1497
(Continued)

*Primary Examiner* — Tuan S Nguyen
(74) *Attorney, Agent, or Firm* — Perkins Coie LLP

(57) ABSTRACT

In certain embodiments, a selection of a first point and a second point within an infrastructure may be obtained via a user interface. A plurality of pathways, including a plurality of cable trays, between the first point and the second point may be determined. A first set of cable trays, having weights that do not exceed weight thresholds, may be identified. Images of the first set of cable trays may be obtained from a plurality of image sensors within the infrastructure. Fullness levels of the first set of cable trays may be determined based on the images. A second set of cable trays, having fullness levels that do not exceed fullness thresholds, may be identified from the first set of cable trays. One or more recommended pathways between the first point and the second point may be determined based on the identified second set of cable trays.

21 Claims, 12 Drawing Sheets

(56) References Cited

U.S. PATENT DOCUMENTS

2009/0248609 A1* 10/2009 Kawai ..................... H02G 3/00
706/55
2012/0253750 A1* 10/2012 Skidanov ................ G06F 30/13
703/1

* cited by examiner

METHOD AND SYSTEM FOR DETERMINING OPTIMAL PATHWAYS FOR INSTALLING CABLES IN AN INFRASTRUCTURE

CROSS REFERENCE TO RELATED APPLICATIONS

This application is a continuation of U.S. patent application Ser. No. 16/787,355, filed on Feb. 11, 2020, the contents of which is hereby incorporated in its entirety by reference.

FIELD OF THE INVENTION

The invention relates to determining optimal pathways for installing cables between different points in an infrastructure.

SUMMARY OF THE INVENTION

Aspects of the invention relate to methods, apparatuses, and systems for determining optimal pathways for installing cables between different points in an infrastructure based on various characteristics of structures within the infrastructure.

One aspect of the disclosure relates to a system for generating a visual indication of pathways for installing cables between two points in an infrastructure supporting telecommunication cables (e.g., such as a data center, data haul, telecommunication room, meet me room, warehouse, etc.) including a plurality of cable trays, the system comprising a computer system that comprises one or more processors programed with computer program instructions that, when executed, cause the computer system to: obtain, via a user interface, a selection of a first point and a selection of a second point within an infrastructure; identify a plurality of pathways between the first point and the second point, the plurality of pathways including a plurality of cable trays; obtain, from a plurality of weight sensors coupled to the plurality of cable trays, weights associated with the plurality of cable trays; identify a first set of cable trays from the plurality of cable trays, such that corresponding weights of the first set of cable trays do not exceed one or more weight thresholds; obtain, from a plurality of image sensors within the infrastructure, images corresponding to the first set of cable trays; determine, based on the images, fullness levels of the first set of cable trays; identify a second set of cable trays from the first set of cable trays, such that corresponding fullness levels of the second set of cable trays do not exceed one or more fullness thresholds, wherein the second set of cable trays is a subset of the first set of cable trays; determine one or more recommended pathways between the first point and the second point based on the identified second set of cable trays; and send a command based on the one or more recommended pathways to generate a visual indication along the one or more recommended pathways.

Another aspect of the disclosure relates to a method for determining pathways for installing cables in an infrastructure, the method being implemented by one or more processors configured to execute one or more computer program instructions. The method may include obtaining, via a user interface, a selection of two points within an infrastructure; identifying pathways between the two points, the pathways including a plurality of structures; obtaining, from first sensors coupled to the plurality of structures, weights associated with the plurality of structures; identifying a first set of structures from the plurality of structures, such that corresponding weights of the first set of structures do not exceed one or more weight thresholds; and determining one or more first pathways between the two points based on the identified first set of structures.

Another aspect of the disclosure may include one or more non-transitory, computer-readable media storing instructions that, when executed by one or more processors, effectuate operations comprising obtaining, via a user interface, a selection of two points within an infrastructure; identifying pathways between the two points, the pathways including a plurality of structures; obtaining, from first sensors coupled to the plurality of structures, weights associated with the plurality of structures; identifying a first set of structures from the plurality of structures, such that corresponding weights of the first set of structures do not exceed one or more weight thresholds; and determining one or more first pathways between the two points based on the identified first set of structures.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. The mere fact that certain elements are recited in mutually different dependent claims does not indicate that these elements cannot be used in combination. In addition, as used in the specification and the claims, the term "or" means "and/or" unless the context clearly dictates otherwise.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
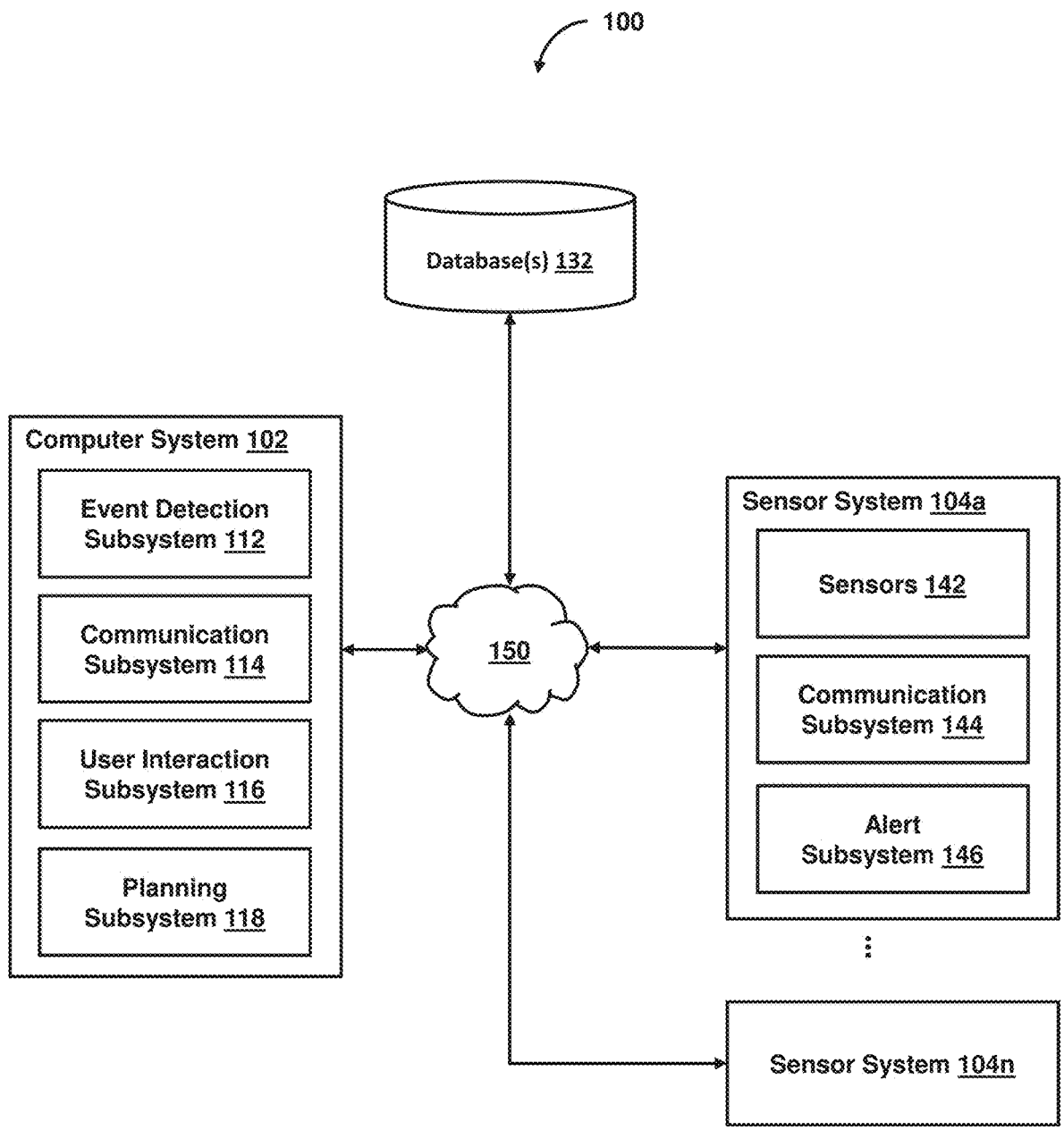
FIG. 1 shows a system for determining optimal pathways for installing cables between points in an infrastructure, in accordance with one or more embodiments.

FIG. 1 shows a system 100 for determining optimal pathways for installing cables between points in an infrastructure based on weight information and fullness information associated with cable trays within the infrastructure, in accordance with one or more embodiments. In some embodiments, an infrastructure may be a data center, data haul, telecommunication room, meet me room, warehouse, or other infrastructure. It should be noted that cable trays are just one example of structures capable of holding cables within an infrastructure, and any connection equipment between two points may be used. As shown in FIG. 1, system 100 may include computer system 102, sensor system 104 (or sensor systems 104a-104n), or other components. Computer system 102 may include event detection subsystem 112, communication subsystem 114, user interaction subsystem 116, planning subsystem 118, or other components. In some embodiments, the computer system 102 may include any type of mobile terminal, fixed terminal, or other device. By way of example, computer system 102 may include a desktop computer, a notebook computer, a tablet computer, a smartphone, a wearable device, a device on the cloud, or other device. It should be noted that, while one or more operations are described herein as being performed by particular components of computer system 102, those operations may, in some embodiments, be performed by other components of computer system 102 or other components of system 100, and while one or more operations are described herein as being performed by particular components of sensor system 104, those operations may, in some embodiments, be performed by other components of sensor system 104 or other components of system 100. As an example, while one or more operations are described herein as being performed by components of computer system 102, those operations may, in some embodiments, be performed by components of sensor system 104 or other components of system 100 and while one or more operations are described herein as being performed by components of sensor system 104, those operations may, in some embodiments, be performed by components of computer system 102 or other components of system 100.

Figure 7A:
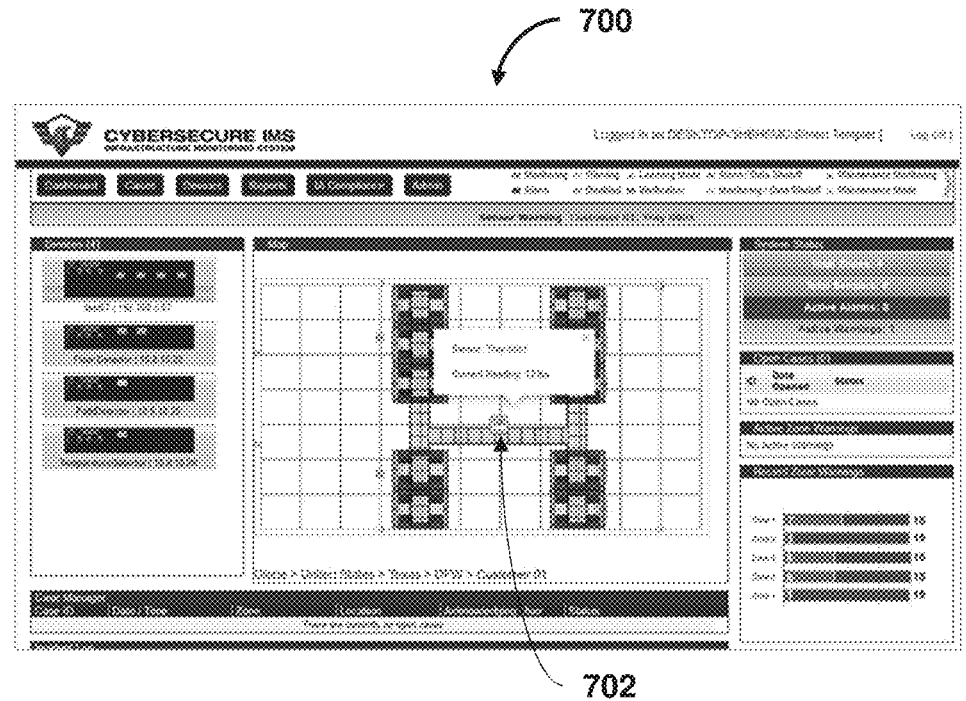
FIGS. 7A and 7B show infrastructure maps of cable trays within an infrastructure, in accordance with one or more embodiments.
Figure 7B:
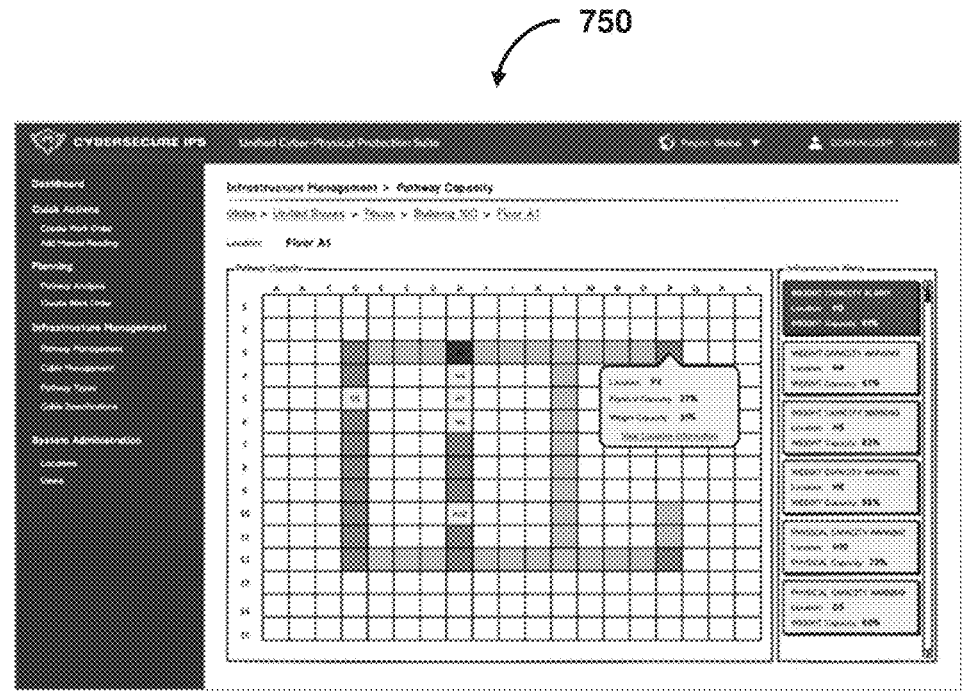
Figure 8:
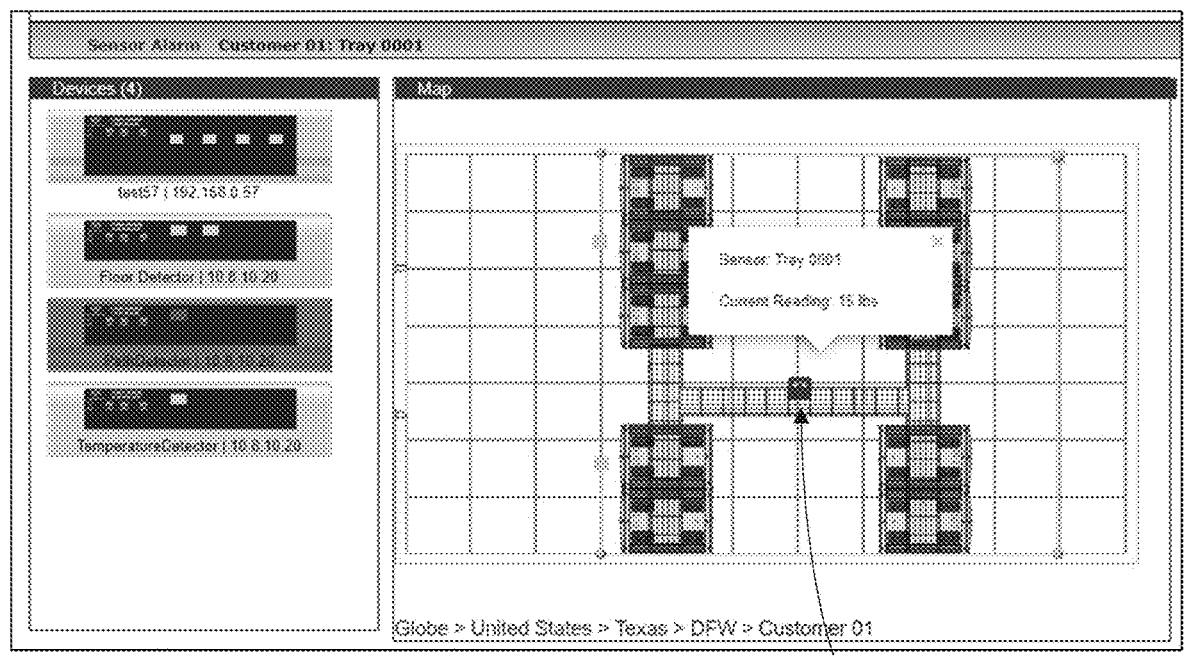
FIG. 8 shows an alert state of an infrastructure map, in accordance with one or more embodiments.

In some embodiments, computer system 102 may comprise layouts, identifying information, locations, amounts, and other information relating to structures in an infrastructure. In some embodiments, structures may include cable trays, cables, servers, sensors, intermediary devices, connected devices, and other structures, as discussed in more detail below. For example, computer system 102 may comprise an updated layout of structures within the infrastructure and may retrieve or receive notifications when changes are made to structures in the infrastructure. Computer system 102 may updated the layouts and corresponding information accordingly. In some embodiments, updated layouts may be displayed to a user (e.g., as shown in FIGS. 7A, 7B, and 8).

In some embodiments, computer system 102 may obtain a plurality of readings from sensor system 104. Sensor system 104 may include sensors 142, communication subsystem 144, and alert subsystem 146. Sensors 142 may, for example, include a weight sensor, such as an S-load cell, a beam load cell, another load cell, a scale, or another type of weight sensor. Sensors 142 may, for example, be a visual sensor, such as a camera. In some embodiments, sensors 142 may be another type of sensor, such as a sensor for testing air quality, temperature, moisture, or other conditions. In some embodiments, the sensor system 104 may include communication subsystem 144 that may communicate (e.g., sensor readings or other data from the sensor system 104) with computer system 102 or database 132. The sensor system 104 may also include alert subsystem 146. Alert subsystem 146 may light up, for example, using LEDs or other lighting mechanism. Illumination options include solid illumination, blinking illumination, and various rates or speeds of illumination in any color supported by the integrated LED. In some embodiments, alert subsystem 146 may vibrate, or emit a sound to generate an alert with respect to a particular sensor. For example, each sensor 142 may include a light source, haptic generator, or speaker that may generate an alert. In some embodiments, alert subsystem 146 comprises alert devices (e.g., LEDs, speakers, or other devices) that are separate from sensors 142 and other connected devices described herein.

Figure 2:
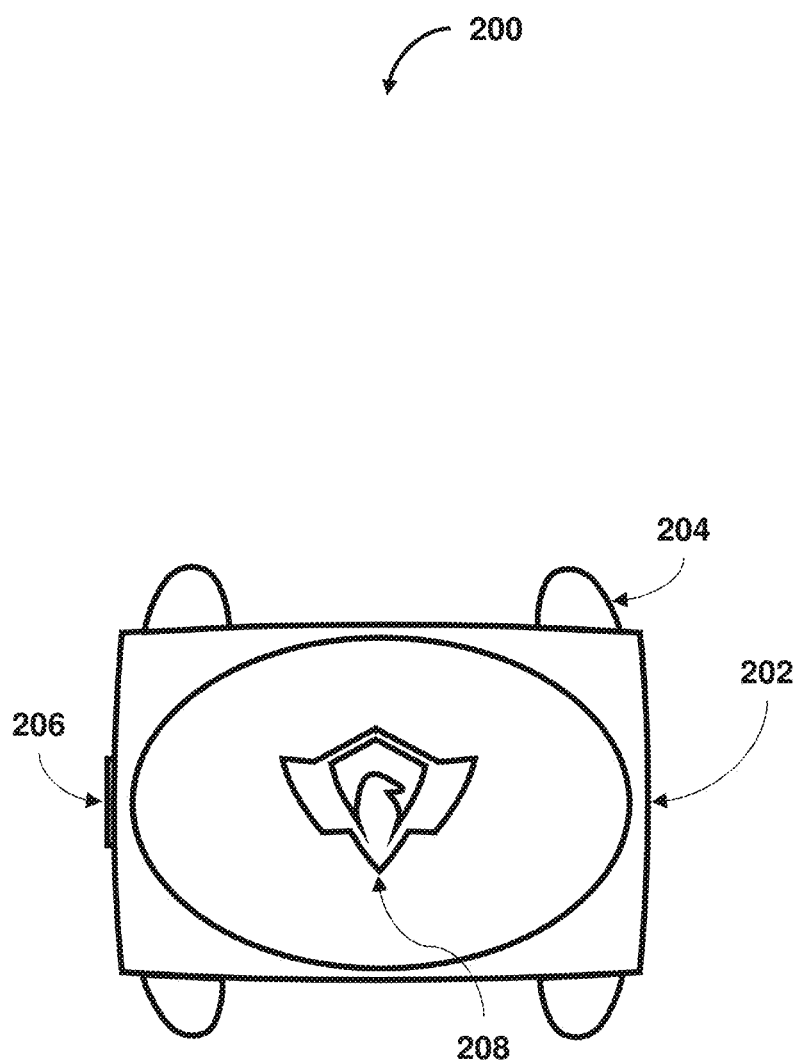
FIG. 2 shows an intermediary device for sending and receiving information, in accordance with one or more embodiments.

In some embodiments, sensors 142 may include one or more connected or intermediary devices. FIG. 2 shows an intermediary device 200 for sending and receiving information between other devices of system 100, in accordance with one or more embodiments.

Intermediary device 200 may be used to communicate information, generate alerts, gather additional data, or for other purposes. Intermediary device 200 may be connected to sensors 142 through communication subsystem 144 and to computer system 102 through network 150. In some embodiments, intermediary device 200 may communicate data and commands between sensors 142 and computer system 102. In some embodiments, sensors 142 and computer system 102 may communicate data and commands directly without intermediary device 200.

Intermediary device 200 may include an external power connector 202. Intermediary device 200 may include mounting structures 204, which may be used to attach intermediary device 200 to infrastructure (e.g., cable trays). Intermediary device 200 may include connection ports 206 (e.g., five pin connection port, USB connection port, or other connection ports). Intermediary device 200 may include a light emitting diode (LED) 208. In some embodiments, an LED or other illuminating device may be separate from sensors 142 and intermediary device 200. In some embodiments, LED 208 (or another LED device) may light up in response to a command to illuminate a pathway for cables. In this example, sensors 142, intermediary device 200, LED 208, a separate LED, or another device may light up in a certain color (e.g., green) along cable trays designated for cable installation. In another example, sensors 142, intermediary device 200, LED 208, a separate LED, or another device may light up in a different color (e.g., red) along cable trays that are not designated for cable installation. In some embodiments, LED 208 may light up in response to a command to generate an alert (e.g., via alert subsystem 146). In some embodiments, intermediary device 200 may additionally comprise speakers for generating sounds or mechanisms for generating haptic vibrations. In some embodiments, intermediary device 200 and sensors 142 may perform similar or the same functions. As an example, while one or more operations are described herein as being performed by sensors 142, those operations may, in some embodiments, be performed by intermediary device 200 or other components of sensor system 104 and while one or more operations are described herein as being performed by intermediary device 200, those operations may, in some embodiments, be performed by sensors 142 or other components of sensor system 104.

Figure 3:
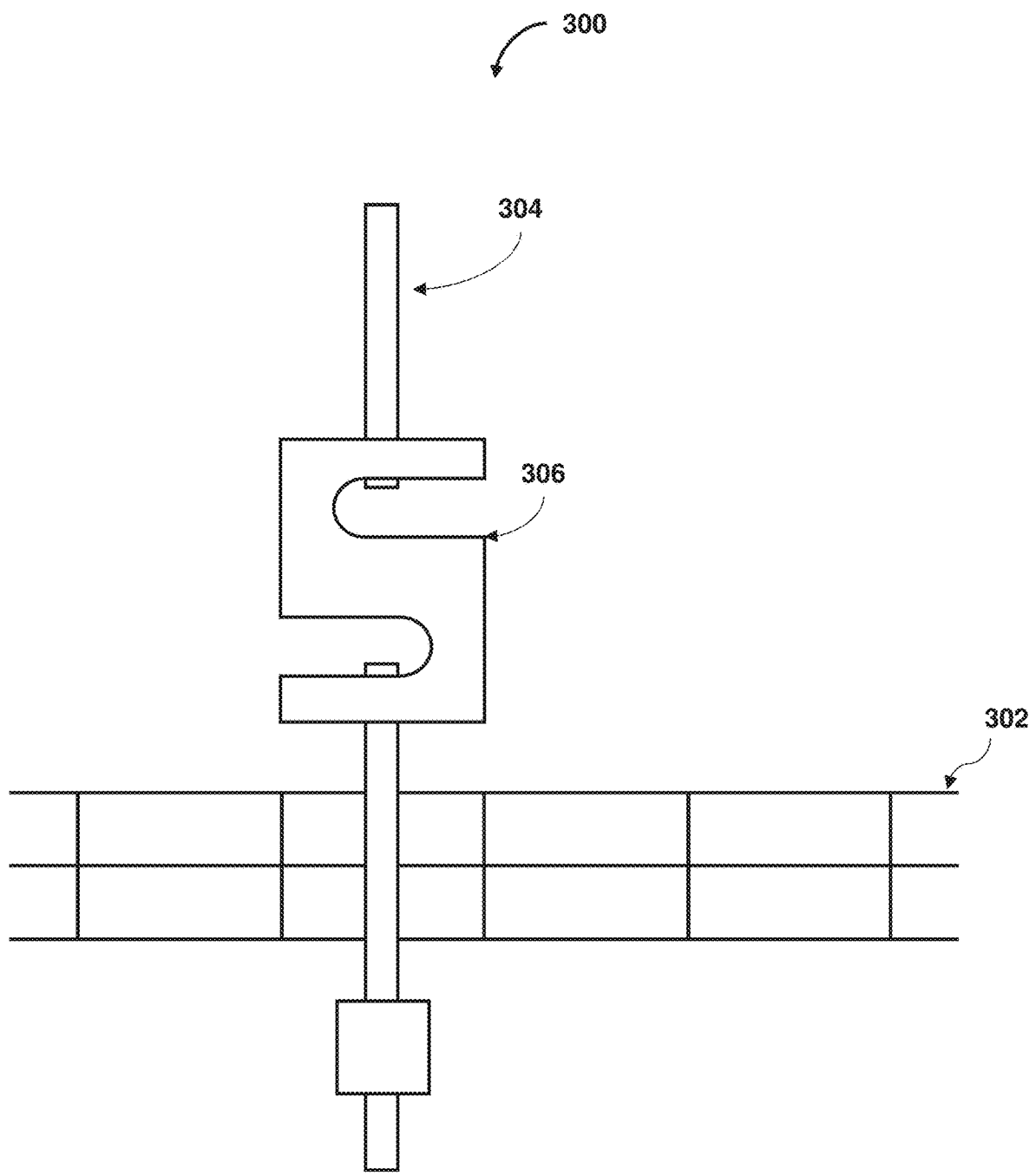
FIG. 3 shows a weight sensor system in an infrastructure, in accordance with one or more embodiments.

Returning to FIG. 1, in some embodiments, sensors 142 may include weight sensors. FIG. 3 shows a weight sensor system 300 in an infrastructure, in accordance with one or more embodiments. In some embodiments, weight sensors may be load cells (e.g., such as S-load cell 306), static weight sensors, or other weight sensors. In some embodiments, the weight sensors may be hanging attachments mounted in-line with a cable tray suspension system. For example, S-load cell 306 may be mounted in-line with a supporting structure 304 which supports a cable tray 302. S-load cell 306 may continuously collect weight data for cable tray 302. In some embodiments, an intermediary device (e.g., such as intermediary device 200, as shown in FIG. 2) may be attached to S-load cell 306 or installed to cable tray 302. S-load cell 306 may send the weight data to computer system 102 directly or through intermediary device 200. In some embodiments, one or more weight sensors may be attached to a cable tray. For example, weight sensors may be installed on multiple supporting rods for a cable tray. The use of multiple weight sensors may allow computer system 102 to determine how cables are distributed within cable tray 302. In some embodiments, the weight sensors may be attached to supporting beams of a cantilever tray system. For example, weight sensors may be installed onto beams supporting cable trays such that the weight of the trays is applied directly to the weight sensors. In some embodiments, weight sensors may be attached directly to the cable trays. For example, weight sensors may be installed on the cable trays such that the weight of cables may be applied directly to the weight sensors. In some embodiments, weight sensors may be attached to a cable tray system in another configuration. In some embodiments, multiple weight sensors may be installed throughout the cable tray infrastructure in a building.

Figure 4:
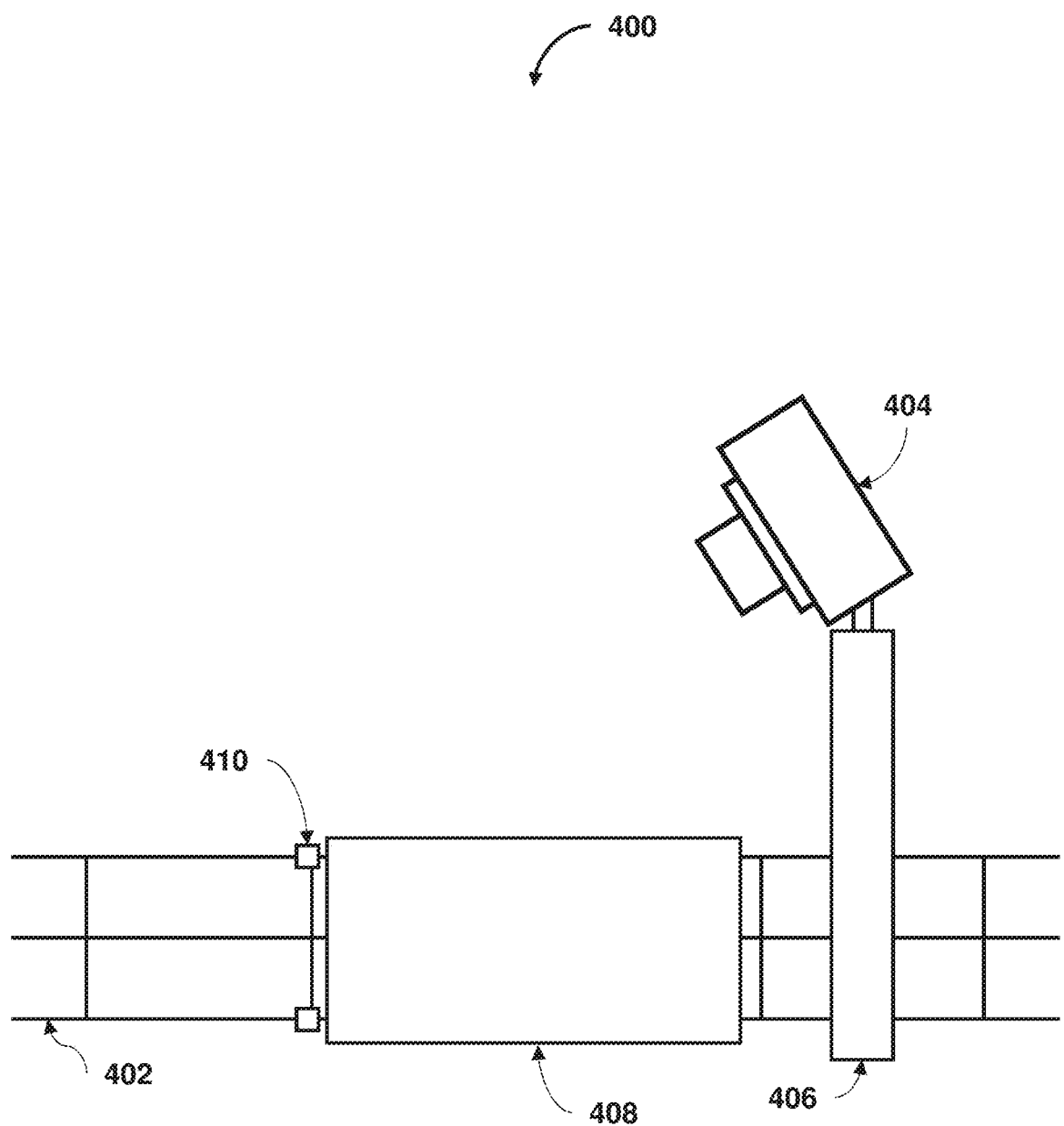
FIG. 4 shows a visual sensor system in an infrastructure, in accordance with one or more embodiments.

In some embodiments, sensors 142 may include visual sensors. FIG. 4 shows a visual sensor system 400 in an infrastructure, in accordance with one or more embodiments. In some embodiments, visual sensors may include a camera 404 or another type of visual sensor. In some embodiments, camera 404 may be attached to a cable tray 402 by a mount 406. The mount 406 may be configured such that camera 404 is positioned at a specific height and angle from cable tray 402. For example, multiple cameras may be installed to multiple cable trays within an infrastructure, each camera being mounted at the same height and angle from the cable tray. In some embodiments, visual sensor system 400 may include a color control cover 408 or color control dots 410. Color control cover 408 may contrast the colors of cables within cable tray 402 so that camera 404 can more accurately detect the presence, size, and number of cables. Color control dots 410 may contrast the colors of cable tray 402 so that camera 404 can more accurately detect the boundaries of cable tray 402. The addition of color control cover 408 and color control dots 410 may be optional (e.g., if camera 404 is able to detect the presence of cables and the boundaries of cable tray 402 without color control cover 408 or color control dots 410). In some embodiments, an intermediary device (e.g., such as intermediary device 200, as shown in FIG. 2) may be attached to camera 404 or installed to cable tray 402. Camera 404 may send visual data to computer system 102 directly or through intermediary device 200 (e.g., via communication subsystem 144).

Figure 5A:
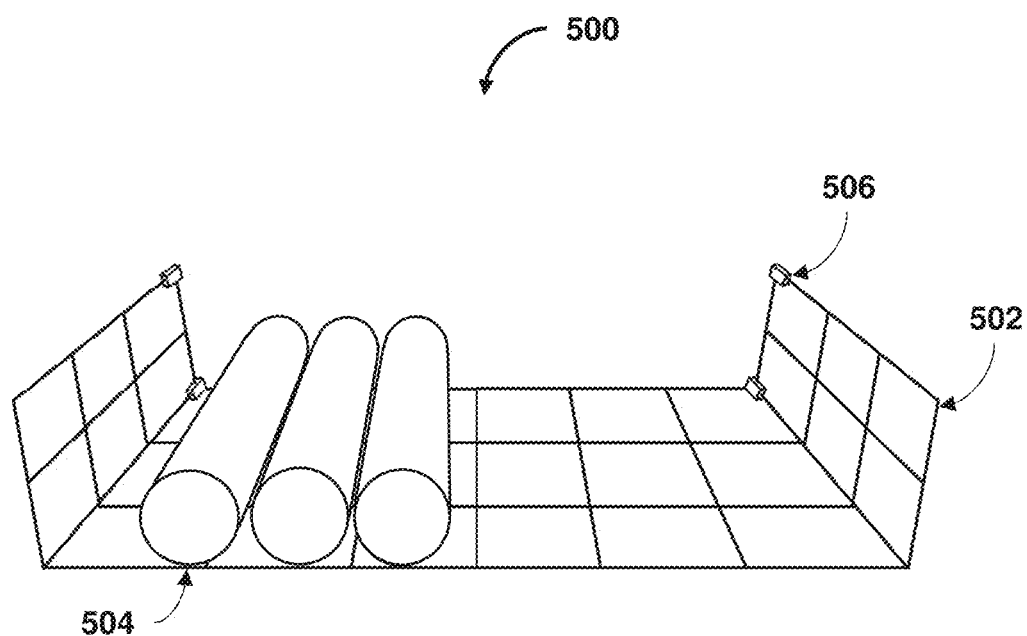
FIGS. 5A and 5B show images of a cable tray, in accordance with one or more embodiments.
Figure 5B:
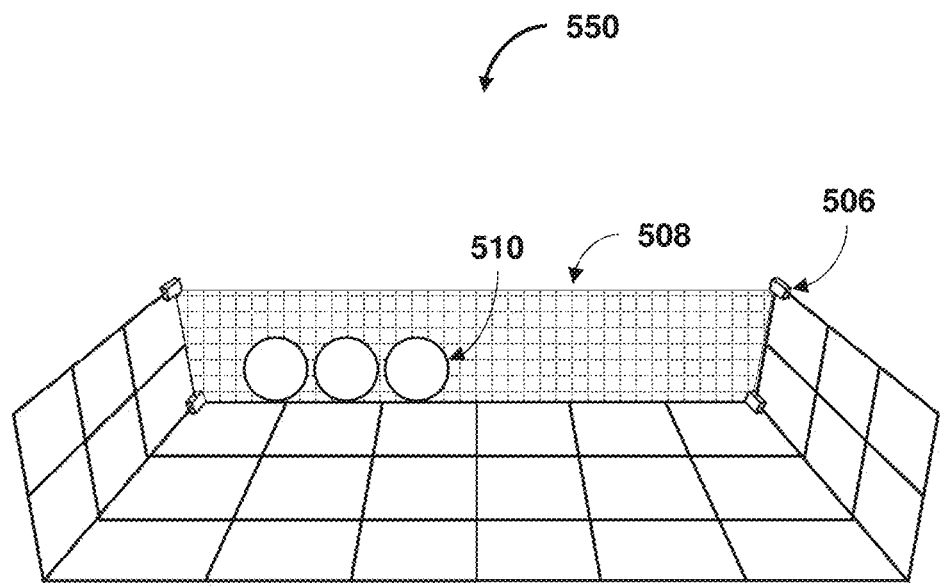

In some embodiments, visual sensor system 400 may obtain images of the contents of cable tray 402. In some embodiments, as shown in FIG. 5A, image 500 of a cable tray may correspond to the interior of cable tray 402, captured by camera 404, as shown in FIG. 4. Image 500 may comprise a cable tray 502 holding cables 504. Cable tray 502 may comprise color control dots 506 which contrast the color of cable tray 502. In some embodiments, color control dots 506 may assist in identification of boundaries of cable tray 502. For example, computer system 102, as shown in FIG. 1, may identify color control dots 506 in image 500 to determine a boundary 508, as shown in processed image 550 in FIG. 5B. As shown in FIG. 5B, boundary 508 may connect color control dots 506 to form a plane (e.g., a cross-section). In some embodiments, boundary 508 may be a physical boundary, such as an end or edge of cable tray 502, a top of cable tray 502, a lane divider of cable tray 502, or another physical boundary. In some embodiments, as shown in FIG. 5B, boundary 508 may be superimposed during image processing. For example, FIG. 5B may depict a processed image 550 based on an image 500 captured by a visual sensor (e.g., camera 404, as shown in FIG. 4). Based on detection of color control dots 506, computer system 102 may superimpose boundary 508 (e.g., connecting color control dots 506) on processed image 550. In some embodiments, superimposed boundaries may include a cross-section of cable tray 502 (e.g., as shown in FIG. 5B), a plane indicating a capacity limit of cable tray 502, or another superimposed boundary of cable tray 502.

In some embodiments, boundary 508 may indicate the capacity of cable tray 502 to hold cables 504. For example, computer system 102 may identify a portion 510 of boundary 508 that is taken up by cables 504, as shown in processed image 550. Portion 510 may represent a fullness level of cable tray 502. In some embodiments, portion 510 may be a ratio, percentage, amount, score, or other value with respect to boundary 508. In some embodiments, a value of portion 510 may be multiplied by a coefficient in order to account for the angle of the camera relative to the cable tray. Portion 510 may also indicate a distribution of cables 504 (e.g., where the cables are placed within cable tray 502). For example, cables 504 are distributed on one side of cable tray 502. In some embodiments, cable tray dividers may be used to divide cable trays into multiple lanes. For example, a cable tray divider may be added along the middle of a cable tray to divide the cable tray into two lanes. In this example, distribution information may indicate which lane holds which cables. In some embodiments, computer system 102 may determine fullness information and distribution information based on image 500 and processed image 550.

Figure 6:
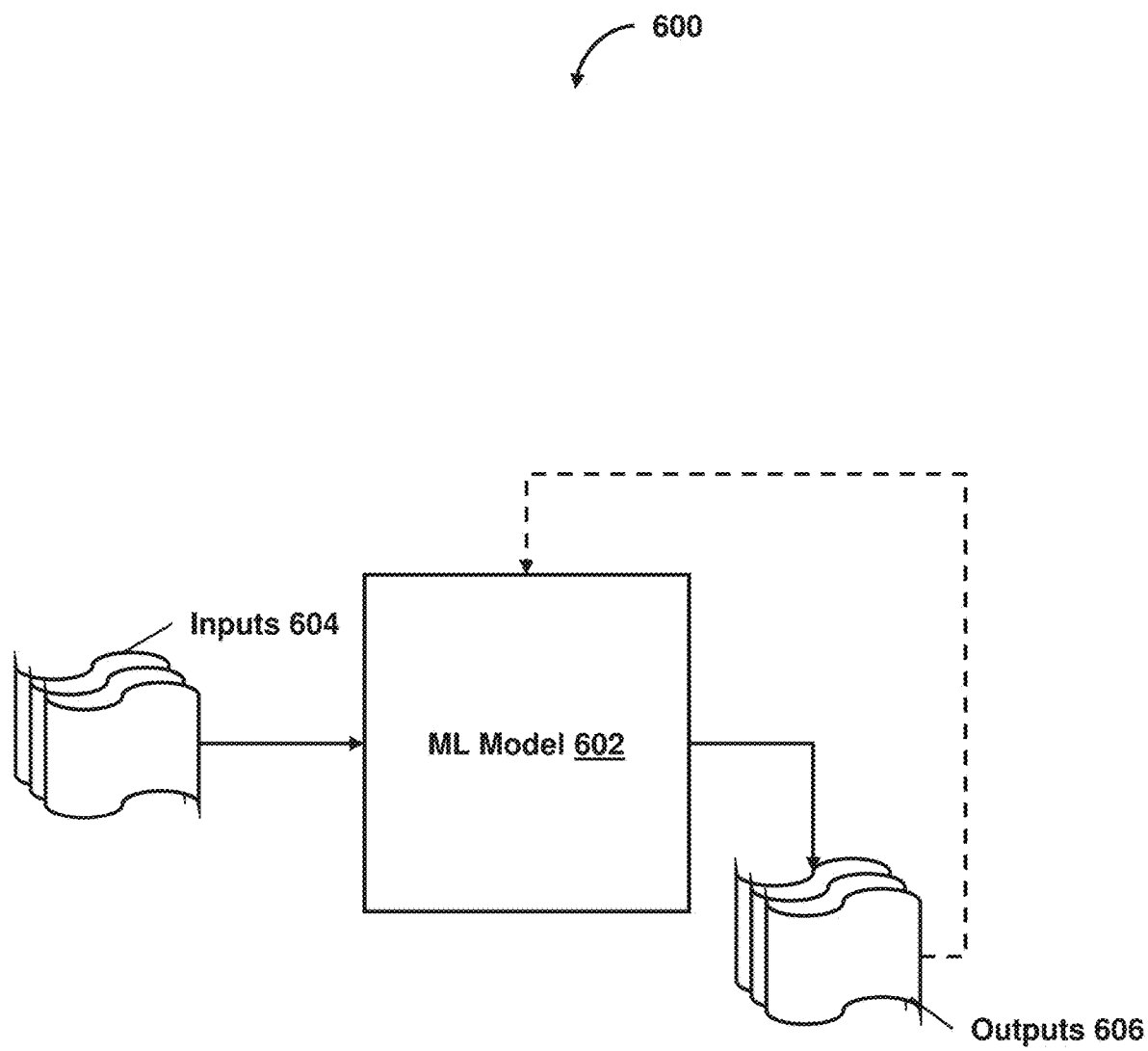
FIG. 6 shows a machine learning model configured to facilitate the determination of cable tray capacity, in accordance with one or more embodiments.

In some embodiments, system 100 may train or configure a prediction model to facilitate the determination of cable tray capacity. In some embodiments, the prediction model may include one or more neural networks or other machine learning models. FIG. 6 shows a machine learning model system 600 configured to facilitate the determination of cable tray capacity, in accordance with one or more embodiments. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free flowing, with connections interacting in a more chaotic and complex fashion.

In some embodiments, the prediction model may update its configurations (for example, weights, biases, or other parameters) based on its assessment of the predictions. Database 132 (e.g., as shown in FIG. 1) may include training data and one or more trained prediction models.

As an example, with respect to FIG. 6, machine learning model 602 may take inputs 604 and provide outputs 606. For example, in some embodiments, inputs 604 may comprise images of full, partially full, and empty cable trays. In some embodiments, inputs 604 may include labels for the images indicating whether each cable tray is full, partially full, or empty. In this example, outputs 606 may comprise predictions based on the images of the cable trays (e.g., "full," "partially full," or "empty" for a given image of a cable tray). Machine learning model 602 may additionally or alternatively be trained to identify capacity of cable trays based on images of the cable trays. For example, if machine learning model 602 identifies a given cable tray as empty or partially full, this may indicate that the cable tray has capacity to hold cables. If machine learning model 602 identifies a given cable tray as full, this may indicate that the cable tray does not have capacity to hold more cables. In some embodiments, inputs 604 may include images of cable trays that are at capacity even if the cable trays are only partially full. For example, regulations may mandate that cable trays be filled only halfway. In this example, cable trays identified as being half-full should therefore be identified as having no capacity for additional cables by machine learning model 602.

In one use case, outputs 606 may be fed back (for example, active feedback) to machine learning model 602 as input to train machine learning model 602 (e.g., alone or in conjunction with user indications of the accuracy of outputs 606, labels associated with the inputs, or with other reference feedback information). In another use case, machine learning model 602 may update its configurations (e.g., weights, biases, or other parameters) based on its assessment of its prediction (e.g., outputs 606) and reference feedback information (e.g., user indication of accuracy, reference labels, or other information). In another use case, where machine learning model 602 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 602 may be trained to generate better predictions.

Returning to FIG. 1, user interaction subsystem 116 may display information about an infrastructure. For example, FIG. 7A shows a literal infrastructure map 700 of cable trays within an infrastructure and FIG. 7B shows a logical infrastructure map 750 of cable trays within an infrastructure, in accordance with one or more embodiments. Literal infrastructure map 700 shows icons representing cable trays and other objects within an infrastructure. The icons may be scaled and positioned on the map to mimic the actual sizes and relative positions of the objects within the infrastructure. Individual icons (e.g., icon 702) may comprise information about the object to which the icon corresponds. For example, icon 702 may comprise information indicating an identifier (e.g., Sensor Tray 0001) of a corresponding cable tray and a current weight reading (e.g., 12 lbs.) from a weight sensor attached to the cable tray. In some embodiments, literal infrastructure map 700 may be color coded to indicate weight values or fullness values of cable trays. For example, green icons may indicate that the corresponding cable tray is holding a small capacity or weight relative to its maximum capacity or weight. Yellow icons may indicate that the corresponding cable tray is nearing its maximum capacity or weight. Red icons may indicate that the corresponding cable tray has exceeded its maximum capacity or weight. Logical infrastructure map 750 shows boxes representing portions of an infrastructure. The boxes on logical infrastructure map 750 may each correspond to a physical area (e.g., one square foot) within the infrastructure. Each box may additionally comprise information about the corresponding portion of the infrastructure. For example, a box may comprise an identifier of the corresponding cable tray (e.g., P3), a fullness level (e.g., 37%), and a weight level (e.g., 31%). In some embodiments, logical infrastructure map 750 may be color coded to indicate weights or fullness levels of cable trays relative to maximum weights or fullness levels (as described above).

In some embodiments, information displayed via user interaction subsystem 116 may indicate the occurrence of an event. For example, event detection subsystem 112 may detect that a weight reading for a cable tray has exceeded a weight threshold associated with the cable tray. For example, FIG. 8 shows an alert state of an infrastructure map 800, in accordance with one or more embodiments. As shown in FIG. 8, icon 802 comprises information indicating that the weight reading of the corresponding cable tray has exceeded a weight threshold. For example, icon 802 may be red, display a weight reading that exceeds a threshold, generate an alert, or otherwise convey information indicating that a weight threshold has been exceeded. In some embodiments, event detection subsystem 112 may detect other types of events. For example, event detection subsystem 112 may detect that a fullness level of a cable tray has exceeded a fullness threshold associated with the cable tray. In some embodiments, event detection subsystem 112 may detect that cables within a cable tray are distributed in a problematic way (e.g., all on one side of the cable tray). In some embodiments, event detection subsystem 112 may detect that cables that should not intersect are intersecting. In some embodiments, event detection subsystem 112 may detect that a sensor is reading a problematic condition (e.g., a high temperature, moisture, or low air quality). In some embodiments, event detection subsystem 112 may detect some other event. In some embodiments, event detection subsystem 112 may detect a malfunction of a sensor (e.g., sensors 142, as shown in FIG. 1), intermediary device (e.g., intermediary device 200, as shown in FIG. 2), or another connected device. For example, event detection subsystem 112 may alert or notify a user of a malfunction via alert subsystem 146 of sensor system 104 or via user interaction subsystem 116 of computer system 102, as shown in FIG. 1.

In some embodiments, in response to the detection of an event, event detection subsystem 112 may send a command to alert subsystem 146 of sensor system 104 (e.g., via communication subsystem 114). In some embodiments, event detection subsystem 112 may send the command to a particular sensor (e.g., sensors 142), to a group of sensors (e.g., along a cable tray or pathway), to sensors in an area of an infrastructure, or to all sensors in an infrastructure. In some embodiments, the command may include instructions to generate an alert (e.g., sound, light, or vibrations). In some embodiments, the type of alert may correspond to the type of event (e.g., a blaring sound when a weight threshold has been exceeded, a light when a fullness threshold has been exceeded, etc.).

Figure 9:
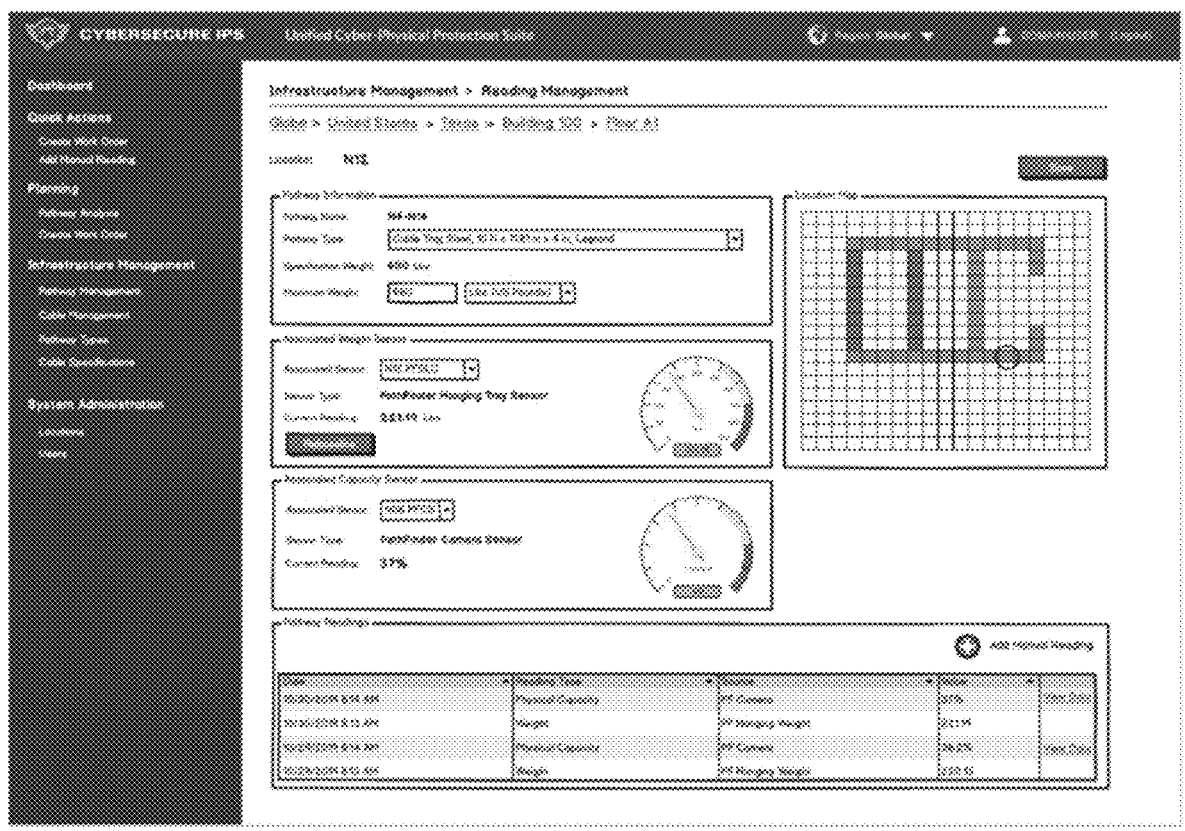
FIG. 9 shows a user interface for adjusting and monitoring weight and fullness of cable trays in an infrastructure, in accordance with one or more embodiments.

In some embodiments, user interaction subsystem 116 may allow the user to interact with computer system 102. For example, FIG. 9 shows a user interface 900 for adjusting and monitoring weight and fullness of cable trays in an infrastructure, in accordance with one or more embodiments. For example, a user may input information such as pathway types, sensor types, weight thresholds, capacity thresholds, and other information via user interaction subsystem 116. User interaction subsystem 116 may display information (e.g., from sensors 142) relative to the information that has been input. For example, user interaction subsystem 116 may display sensor readings and thresholds for the user to monitor. In some embodiments, user interaction subsystem 116 may display the current weight or fullness readings as percentages of weight or fullness thresholds. In some embodiments, user interaction subsystem 116 may display weight or fullness readings according to a color scale (e.g., green, yellow, or red based on proximity to thresholds). In some embodiments, user interaction subsystem 116 may display sensor readings in some other manner. In some embodiments, user interaction subsystem 116 may provide the user with tools to initiate alerts, send commands to sensors, modify work orders, or make other changes based on the information provided via user interaction subsystem 116.

In some embodiments, user interaction subsystem 116 may provide planning capabilities (e.g., via planning subsystem 118). For example, user interaction subsystem 116 and planning subsystem 118 may allow the user to plan and input work orders. Work orders may comprise plans to add, move, or remove cables, cable trays, or other objects within the infrastructure. In some embodiments, the work order may comprise information about the type of activity to be performed (e.g., adding, moving, or removing cables, or other activities). In some embodiments, a work order may comprise information about a location of the work order. For example, the location may be an address, GPS coordinates, map coordinates (e.g., F3), or another location indicator. The location may also include start and end locations on a map in order to indicate which portions of the infrastructure will be affected. In some embodiments, the work order may comprise information about which company or companies will be performing the work order. For example, the information may include names, contact information, payment information, and other company information. In some embodiments, the work order may comprise information about the days that the work is expected to be performed. For example, the dates may be input into user interaction subsystem 116 so that event detection subsystem 112 may ignore certain sensor readings during that time. As another example, commands may be sent to sensors (e.g., sensors 142) or intermediary devices (e.g., such as intermediary device 200, as shown in FIG. 2) during the days that the work is expected to be performed. For example, the work order may indicate that sensors or intermediary devices along the cable trays in which new cables are to be installed should light up during business hours for the duration of the scheduled work order. As another example, event detection subsystem 112 may schedule a test to verify that the work has been performed by the last scheduled date (e.g., as discussed in further detail below).

In some embodiments, the work order may comprise information about the types and quantities of cables included in the work order. For example, the user may select "144-stand fiber optic cable" from a selection list and may enter a quantity of two (2) into user interaction subsystem 116. In some embodiments, the user may enter new cable types (e.g., according to manufacturer specifications). Planning subsystem 118 may have information about the types of cables in the selection list pre-stored. For example, planning subsystem 118 may store information about a 144-stand fiber optic cable that includes an expected weight of 0.404 pounds per linear foot (PLF) and a physical density of 10.5 mm (0.41 in). Planning subsystem 118 may obtain information about new types of cable from database 132. In some embodiments, the work order may comprise information about user specific data, such as internal reference numbers, work supervisors, internal goals, cost information, and other data.

In some embodiments, planning subsystem 118 may also receive mappings of existing infrastructure and cables via user interaction subsystem 116. For example, the user may define floor plans, maps, drawings, blueprints, or other layouts designating the types, locations, and amounts of structures and cables that exist within an infrastructure. The user may drag and drop, highlight, click, color code, or otherwise alter a layout in order to indicate the existence of structures or cables. The user may also designate different layers of pathways. For example, there may be multiple horizontal layers of pathways at different heights. In some embodiments, the user may indicate how the layers are related to each other spatially (e.g., if the layers are six feet apart, the user may input six feet as the layer height). The layout information input by the user into user interaction subsystem 116 may be utilized by planning subsystem 118 to generate two-dimensional and three-dimensional layouts of the infrastructure and existing cables.

Figure 10A:
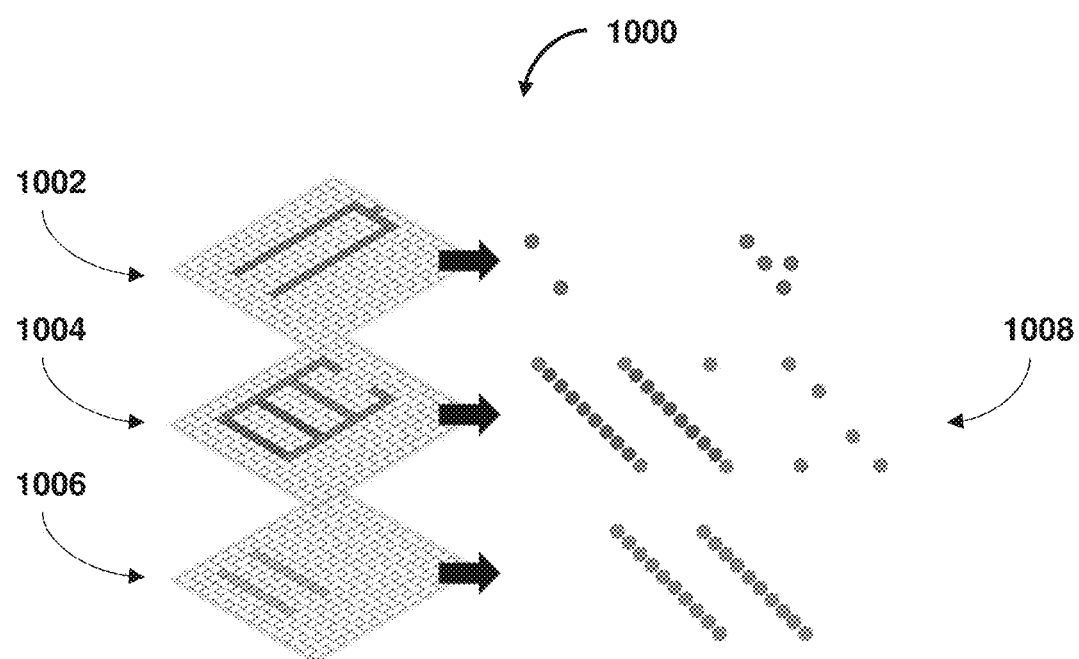
FIGS. 10A and 10B show infrastructure layouts and corresponding node networks, in accordance with one or more embodiments.

FIG. 10A shows infrastructure layout 1000, in accordance with one or more embodiments. As shown in FIG. 10A, layers 1002, 1004, and 1006 represent existing structures and cables within the infrastructure. The structures in these layers may connect within a single layer or between multiple layers. Layers 1002, 1004, and 1006 may be different types of layers. For example, layer 1002 and layer 1004 may be distribution layers. In some embodiments, a distribution layer may represent cable pathways at different heights in an infrastructure. In some embodiments, layer 1006 may be an asset layer. In some embodiments, asset layers may represent server racks containing equipment. In some embodiments, planning subsystem 118 may generate a node network from layers 1002, 1004, and 1006. In some embodiments, each square in layers 1002, 1004, and 1006 may be converted to a node of a particular type. For example, squares in layer 1006, which may be an asset layer, may be converted to asset nodes. Asset nodes may represent a device to which a cable physically connects (e.g., equipment, racks, and other devices). In some embodiments, a node may be a source node or an end node, representing a physical start point or end point not managed by the user's system. For example, a source node or end node may be a network rack, switchboard, or other connection that is managed externally. In some embodiments, there may additionally be connector nodes and other types of nodes. In some embodiments, the type of node may indicate whether the nodes connect to other nodes within the same layer or to nodes from different layers. In some embodiments, the node may comprise attributes such as maximum physical capacity, current physical capacity, maximum weight capacity, current weight capacity, physical distance between nodes, location, layer, type, and other attributes.

Figure 10B:
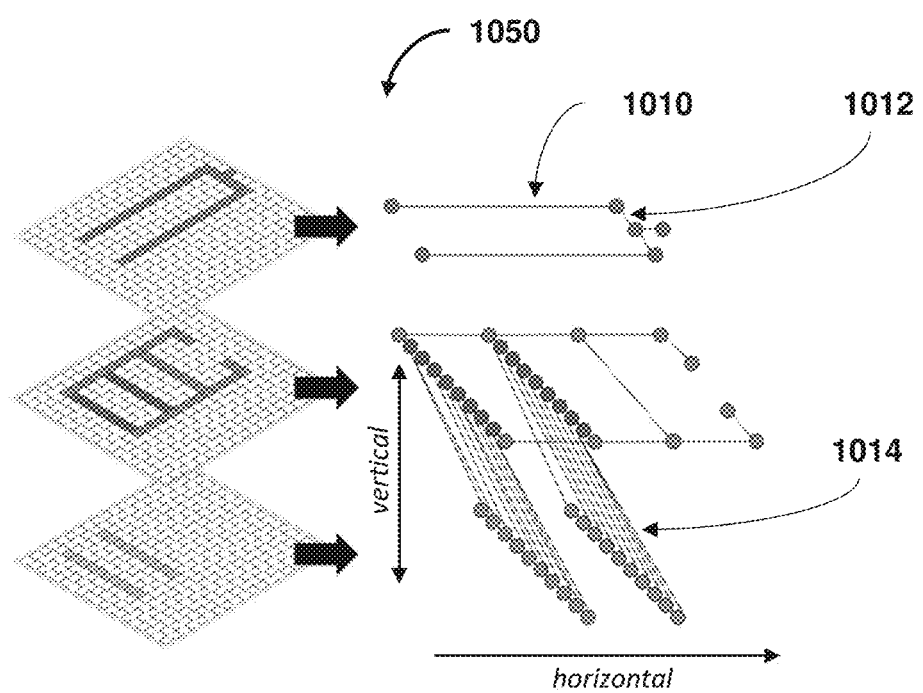

As shown in FIG. 10A, planning subsystem 118 may generate a node network 1008 comprising the individual nodes generated from layers 1002, 1004, and 1006. The node network may represent the locations and spatial relationships between objects within the infrastructure. In some embodiments, planning subsystem 118 evaluates each node along one axis (e.g., the x axis). If planning subsystem 118 identifies any adjacent nodes along the perpendicular axis (e.g., the y axis), planning subsystem 118 determines that there is an intersection at that location. Planning subsystem 118 may add intersections to node network 1008. In some embodiments, planning subsystem 118 may search for intersections along each relevant axis. In some embodiments, sensors (e.g., sensors 142) may be placed at the identified intersections. In some embodiments, the type of each node may determine its connectivity with other nodes. For example, adjacent source nodes may be connected to each other, adjacent end nodes may be connected to each other, adjacent asset nodes may be connected to each other, and any connector nodes may be connected to each other. In some embodiments, planning subsystem 118 may determine distances between nodes based on the spatial relationships between the nodes. For example, FIG. 10B shows infrastructure layout 1050, in accordance with one or more embodiments. Infrastructure layout 1050 shows connection 1010, which connects two nodes from the same layout (e.g., layer 1002). Based on the scale of the layout, planning subsystem 118 may determine that connection 1010 has a length of thirty feet. Connection 1012, which also connects two nodes from the same layout (e.g., layer 1002) may have a length of two feet. Planning subsystem 118 may determine that connection 1014, which connects two nodes from different layouts (e.g., layer 1004 and layer 1006) has a length of eight feet. In some embodiments, a user-entered value for a distance between layouts, a user-entered value for a scale of a layout, or other user-entered values may be used by planning subsystem 118 to calculate the lengths of the connections. In some embodiments, connections between nodes may comprise information about the structures represented by the connections. For example, connections may comprise information about links, cable trays, cables, materials, regulations, or other information relating to the connection.

In some embodiments, planning subsystem 118 may build duplicate node networks in order to perform different calculations or to achieve different objectives. For example, planning subsystem 118 may determine and recommend pathways based on distance, density, maximum capabilities, diversity requirements for cabling, other factors, or any combination of factors. Planning subsystem 118 may determine and recommend the most compliant pathways with respect to standards, regulations, safety precautions, internal guidelines, or other guidelines. In some embodiments, planning subsystem 118 may determine and recommend the most cost-efficient pathways (i.e., using the least materials or requiring the least manpower for installation). In some embodiments, planning subsystem 118 may determine a plurality of paths having the lowest number of nodes in common with each other (e.g., to avoid intersecting cables). In some embodiments, planning subsystem 118 may determine and recommend the most optimal pathway according to any factor or combination of factors.

In some embodiments, planning subsystem 118 may receive a request to determine a new pathway for cables in an infrastructure (e.g., via user interaction subsystem 116). For example, planning subsystem 118 may receive a request to determine one or more recommended pathways between a first point and a second point in an infrastructure. For example, planning subsystem 118 may receive a selection of a first point and a selection of a second point via user interaction subsystem 116. Planning subsystem 118 may identify a plurality of pathways between the first selected point and the second point. In some embodiments, the plurality of pathways may include structures (e.g., cable trays, ducts, channels, or other structures). In some embodiments, identifying the plurality of pathways may comprise identifying a pathway of nodes and connections between two selected points (e.g., two selected nodes) in a network. In some embodiments, identifying the plurality of pathways may comprise identifying a pathway connecting two points on a map (e.g., logical infrastructure map 750, as shown in FIG. 7B). In some embodiments, planning subsystem 118 may use any of the criteria described above for determining and recommending pathways in the infrastructure.

In some embodiments, planning subsystem 118 may obtain information associated with cable trays along the identified pathways. In some embodiments, planning subsystem 118 may obtain information from one or more sensors (e.g., sensors 142, as shown in FIG. 1) coupled to the cable trays. In some embodiments, the one or more sensors may be weight sensors (e.g., S-load cell 306, as shown in FIG. 3), visual sensors (e.g., camera 404, as shown in FIG. 4), air quality sensors, temperature sensors, moisture sensors, or another type of sensor. For example, planning subsystem 118 may receive weights associated with the cable trays from weight sensors coupled to the cable trays. In some embodiments, the weights may be raw weight readings, average weight readings, max weight readings, weight readings as a percent of a weight capacity, or other weight information. In some embodiments, based on the weights received from the sensors, planning subsystem 118 may identify a set of pathways, out of the pathways connecting the two selected points, for which the weights of the cable trays do not exceed one or more weight thresholds associated with the cable trays. For example, planning subsystem may utilize weights of the cables that will be installed, weights of cables already in the cable trays, weight thresholds, guidelines, and other information in order to select the set of pathways that may be used.

In some embodiments, planning subsystem 118 may identify a first set of the plurality of cable trays. In some embodiments, the first set may include cable trays having weights that do not exceed one or more weight thresholds. In some embodiments, weight thresholds may be based upon a cable tray type, cable tray size, cable type, cable size, material type, regulation, user-input values, or any other factors. In some embodiments, planning subsystem 118 may calculate the weight thresholds based on a combination of factors. Planning subsystem 118 may identify the first set of cable trays by comparing the weights of cables in the plurality of cable trays to the weight thresholds. In some embodiments, planning subsystem 118 may compare, to the weight thresholds, the sum of the weights of cables already in the cable trays and the weights of the cables to be installed. For example, the first set of cable trays may be cable trays for which the sum does not exceed a weight threshold associated with the cable trays. In some embodiments, the first set of cable trays may include one or more pathways. For example, planning subsystem 118 may identify one or more pathways for which no cable tray in the pathway has a weight exceeding a threshold. In some embodiments, planning subsystem 118 may identify a first set of pathways made up of the first set of identified cable trays.

In some embodiments, planning subsystem 118 may obtain additional information associated with cable trays along the identified pathways. In some embodiments, planning subsystem 118 may obtain information from one or more sensors (e.g., sensors 142, as shown in FIG. 1) coupled to the cable trays. In some embodiments, the one or more sensors may be weight sensors (e.g., S-load cell 306, as shown in FIG. 3), visual sensors (e.g., camera 404, as shown in FIG. 4), air quality sensors, temperature sensors, moisture sensors, or another type of sensor. For example, planning subsystem 118 (or another component of computer system 102) may obtain images associated with the cable trays from visual sensors coupled to the cable trays (e.g., camera 404, as shown in FIG. 4).

Once planning subsystem 118 has obtained the images, planning subsystem 118 may determine fullness levels of the cable trays depicted in the images. For example, the images may depict cables in a cable tray (e.g., as shown in FIGS. 5A and B). Planning subsystem 118 may determine a fullness level based on the images (e.g., using image processing, machine learning, or other techniques). In some embodiments, the fullness level may comprise a ratio, percentage, amount, score, or other value. In some embodiments, the ratio, percentage, amount, score, or other value may be multiplied by a coefficient in order to account for the angle of the camera (e.g., camera 404, as shown in FIG. 4) relative to the cable tray. In some embodiments, the fullness information may comprise distribution information (e.g., how the cables are distributed in the cable tray, how the cables are distributed in cable tray lanes, etc.). For example, as shown in FIGS. 5A and 5B, cables 504 are distributed on one side of cable tray 502. This information may indicate that no more cables may be installed on the same side of cable tray 502 as cables 504. In some embodiments, based on the images received from the sensors and cable tray fullness levels determined by planning subsystem 118, planning subsystem 118 may identify a set of pathways, out of the pathways connecting the two selected points, for which the fullness levels of the cable trays do not exceed one or more fullness thresholds associated with the cable trays. For example, planning subsystem may utilize sizes of the cables that will be installed, existing fullness levels of the cable trays, fullness thresholds, guidelines, and other information in order to select the pathways that may be used.

In some embodiments, planning subsystem 118 may identify a second set of the plurality of cable trays. In some embodiments, the second set may include cable trays having fullness levels that do not exceed one or more fullness thresholds. In some embodiments, fullness thresholds may be based upon a cable tray type, cable tray size, cable type, cable size, material type, regulation, user-input values, or any other factors. In some embodiments, planning subsystem 118 may calculate the fullness thresholds based on a combination of factors. Planning subsystem 118 may identify the second set of cable trays by comparing the fullness levels of the plurality of cable trays to the fullness thresholds. In some embodiments, planning subsystem 118 may compare, to the fullness thresholds, the fullness levels based on cables already in the cable trays and cables to be installed. For example, the second set of cable trays may comprise cable trays for which the total fullness levels after cable installation will not exceed the fullness thresholds. For example, planning subsystem 118 may identify one or more pathways for which no cable tray in the pathway has a fullness level exceeding a threshold. In some embodiments, planning subsystem 118 may identify a second set of pathways made up of the second set of identified cable trays. In some embodiments, the second set of cable trays may be a subset of the first set of cable trays. In some embodiments, the order of identified sets of cable trays may vary. For example, in some embodiments, planning subsystem 118 may identify a set of cable trays based on fullness levels first and weights second. In this example, the first set may be a subset of the second set of cable trays. In some embodiments, multiple sets of cable trays may be identified in parallel according to various criteria. For example, planning subsystem 118 may identify the first and second sets of cable trays in parallel and may subsequently identify an intersection of the first and second sets of cable trays (i.e., to identify cable trays belonging to both sets). Planning subsystem 118 may then determine pathways comprising the cable trays belonging to both sets. In some embodiments, other methods of identifying cable trays according to one or more criteria may be used.

In some embodiments, planning subsystem 118 may determine one or more recommended pathways between the first point and the second point based on the identified second set of cable trays. In some embodiments, the recommended pathways may comprise one or more pathways for which every cable tray in the one or more pathways belongs to the first set of cable trays (as identified above). In some embodiments, the recommended pathways may comprise one or more pathways for which every cable tray in the pathway belongs to the second set of cable trays (as identified above). In some embodiments, the recommended pathways may comprise one or more pathways for which every cable tray in the pathway belongs to both sets of cable trays. In some embodiments, the recommended pathways may comprise one or more pathways for which every cable tray in the pathway satisfies another criteria. In some embodiments, planning subsystem 118 may recommend the most compliant pathways with respect to standards, regulations, safety precautions, internal guidelines, or other guidelines. In some embodiments, planning subsystem 118 may utilize a combination of above-identified criteria and other criteria to determine the one or more recommended pathways.

In some embodiments, planning subsystem 118 may generate a visual indication of the one or more recommended pathways. For example, in some embodiments, planning subsystem 118 may send a command, to user interaction subsystem 116, to generate for display the one or more recommended pathways. For example, user interaction subsystem 116 may generate for display the one or more recommended pathways on a map (e.g., literal infrastructure map 700 or logical infrastructure map 750). In some embodiments, user interaction subsystem 116 may generate for display the one or recommended pathways as selectable pathways. For example, the user may view the one or more recommended pathways, hover over the recommended pathways for additional information, select a desired pathway, and take other actions. In some embodiments, planning subsystem 118 or user interaction subsystem 116 may send a command to generate a visual indication along the one or more recommended pathways or the one or more selected pathways (e.g., selected via user interaction subsystem 116). For example, the command may be sent to one or more sensors (e.g., sensors 142, as shown in FIG. 1), one or more intermediary devices (e.g., intermediary device 200, as shown in FIG. 2), or another connected device (e.g., via network 150). For example, the command may cause the sensor, intermediary device, or other connected device to light up along the one or more recommended or selected pathways. In some embodiments, the command may cause the sensor, intermediary device, or other connected device to make a sound along the one or more recommended or selected pathways. In some embodiments, the command may cause the sensor, intermediary device, or other connected device to generate a haptic vibration along the one or more recommended or selected pathways. In some embodiments, the command may cause the sensor, intermediary device, or other connected device to otherwise indicate the one or more recommended or selected pathways. In some embodiments, the commands may be scheduled to coincide with scheduled work (e.g., cable installation). For example, the commands may be scheduled to indicate the one or more recommended or selected pathways during business hours on days when cable installation is scheduled. In some embodiments, indications of the recommended or selected pathways may be otherwise customized (e.g., via user interaction subsystem 116).

In some embodiments, planning subsystem 118 may monitor cable installation for the one or more selected pathways. For example, planning subsystem 118 and event detection subsystem 112 may monitor the weights, fullness levels, and other attributes of cable trays in an infrastructure as cables are installed. If one or more weight thresholds or fullness thresholds is exceeded, event detection subsystem 112 may send a command to user interaction subsystem 116 to generate an alert. For example, FIG. 8 depicts an alert state indicating an exceeded weight threshold. In some embodiments, user interaction subsystem 116 may display an alert state indicating an exceeded weight or fullness threshold. In some embodiments, event detection subsystem 112 may display an alert state indicating another issue, such as a problematic distribution of cables within a cable tray, a high moisture level, a high temperature, a poor air quality, or another issue. In some embodiments, event detection subsystem 112 may send a command to a connected device in order to cause the connected device to generate an alert. For example, event detection subsystem 112 may send the command to a sensor (e.g., sensors 142, as shown in FIG. 1), an intermediary device (e.g., intermediary device 200, as shown in FIG. 2), or another connected device. In some embodiments, the command may cause the sensor, the intermediary device, or another connected device (e.g., such as an LED or speaker) to light up, generate a sound, or generate haptic vibrations (as described above).

In some embodiments, planning subsystem 118 may monitor the cable installation for the one or more selected pathways in order to perform work validation. For example, planning subsystem 118 may determine if the cables were installed at the intended locations. For example, planning subsystem 118 may monitor the weights and fullness levels of all cable trays within an infrastructure. Planning subsystem 118 may confirm that the weights and fullness levels of the selected pathways changed by the expected amount based on the scheduled work order. Planning subsystem 118 may also confirm that the weights and fullness levels of cable trays not included in a work order did not change. Planning subsystem 118 may additionally monitor for excess cabling that should not have been installed. For example, if additional cables were added erroneously or if slack cable was looped and left within the infrastructure, planning subsystem 118 may identify the extra cables via information received from sensors (e.g., S-load cell 306, as shown in FIG. 3, or camera 404, as shown in FIG. 4). If a work order involves installing, removing, and moving cables, planning subsystem 118 may monitor all cable trays in all pathways involved for changes in weight and fullness levels. In some embodiments, planning subsystem 118 may obtain images from visual sensors connected to the cable trays in order to further validate cable installation. For example, planning subsystem 118 may obtain images from cameras (e.g., camera 404, as shown in FIG. 4) in order to confirm that the correct type of cables have been installed in the correct trays with the correct distribution. For example, the images may depict cables in a cable tray (e.g., as shown in FIG. 5A). The cable type may be identifiable by the cable color, labels, or markings on the cables, the visual appearance of the cables, or some other characteristic of the cables. Planning subsystem 118 may confirm based on the images that the correct type and number of cables have been installed in the correct distribution in the cable tray. In some embodiments, planning subsystem 118 may identify cables that have been erroneously cut (e.g., based on images obtained from sensors such as camera 404, as shown in FIG. 4).

In some embodiments, planning subsystem 118 or event detection subsystem 112 may identify any issues that arise during work validation (as described above). Planning subsystem 118 or event detection subsystem 112 may determine whether any discrepancies (e.g., between expected and actual weight changes, expected and actual fullness level changes, or other changes) fall within a threshold of acceptable variance. For example, if a weight increase of a cable tray included in a work order falls above the expected weight increase, planning subsystem 118 may determine whether the weight change discrepancy is acceptable. For discrepancies during work validation that are not acceptable, planning subsystem 118 may notify or alert a user. In some embodiments, event detection subsystem 112 may detect an event (e.g., an unexpected change in weight) and notify or alert a user. For example, planning subsystem 118 or event detection subsystem 112 may cause user interaction subsystem 116 to generate a notification or alert indicating the work validation issue. In some embodiments, planning subsystem 118 or event detection subsystem 112 may cause sensors (e.g., sensors 142, as shown in FIG. 1), intermediary devices (intermediary device 200, as shown in FIG. 2), or another connected device to generate an alert at the location of the work validation issue. For example, a sensor, intermediary device, or other connected device attached to a cable tray weighing more than the expected amount may generate a sound. These alerts and notifications may allow users and workers to identify and correct for any discrepancies that arise during installation of cables.

Figure 11:
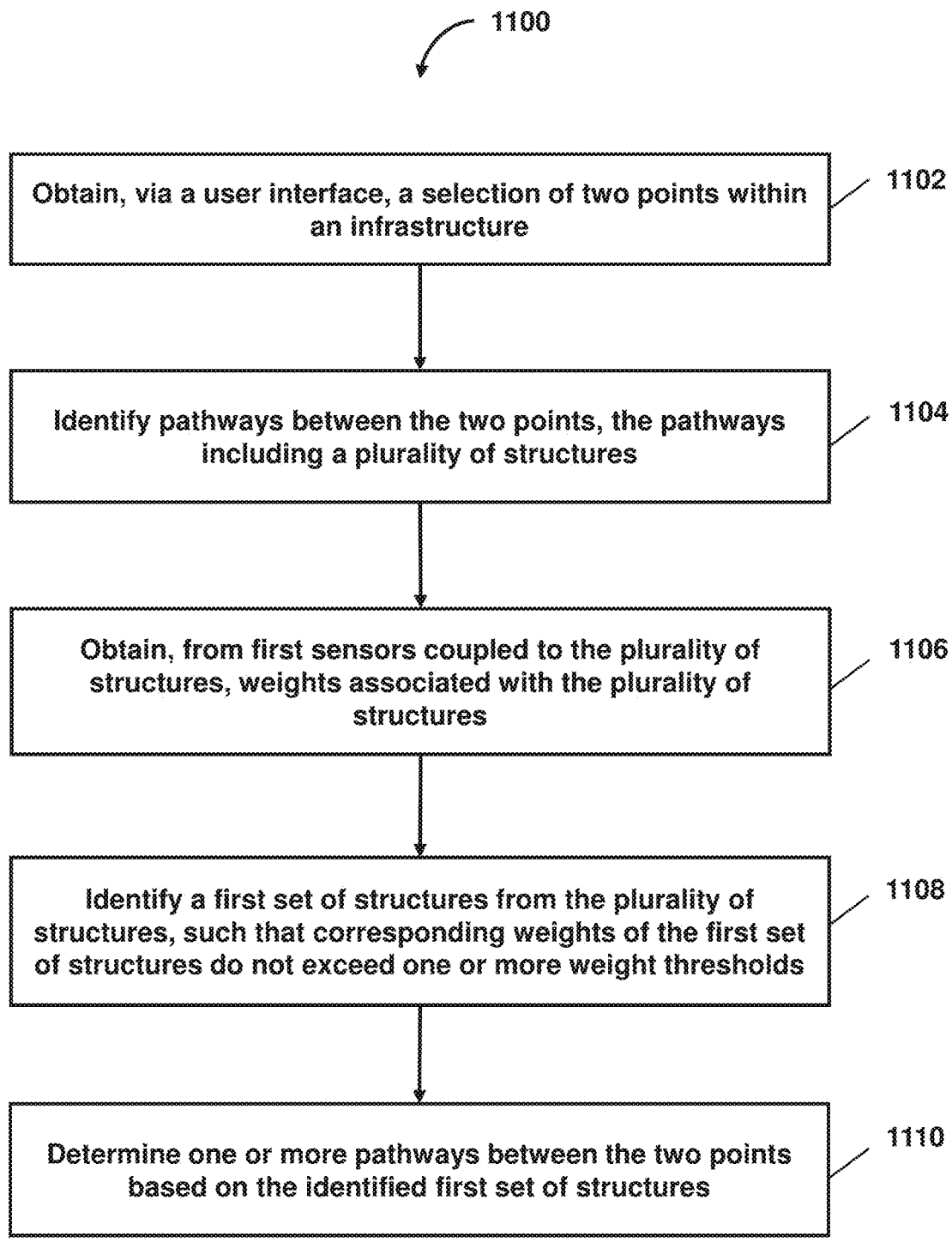
FIG. 11 shows a flowchart of a method for determining one or more pathways between two points in an infrastructure based on weight thresholds, in accordance with one or more embodiments.
Figure 12:
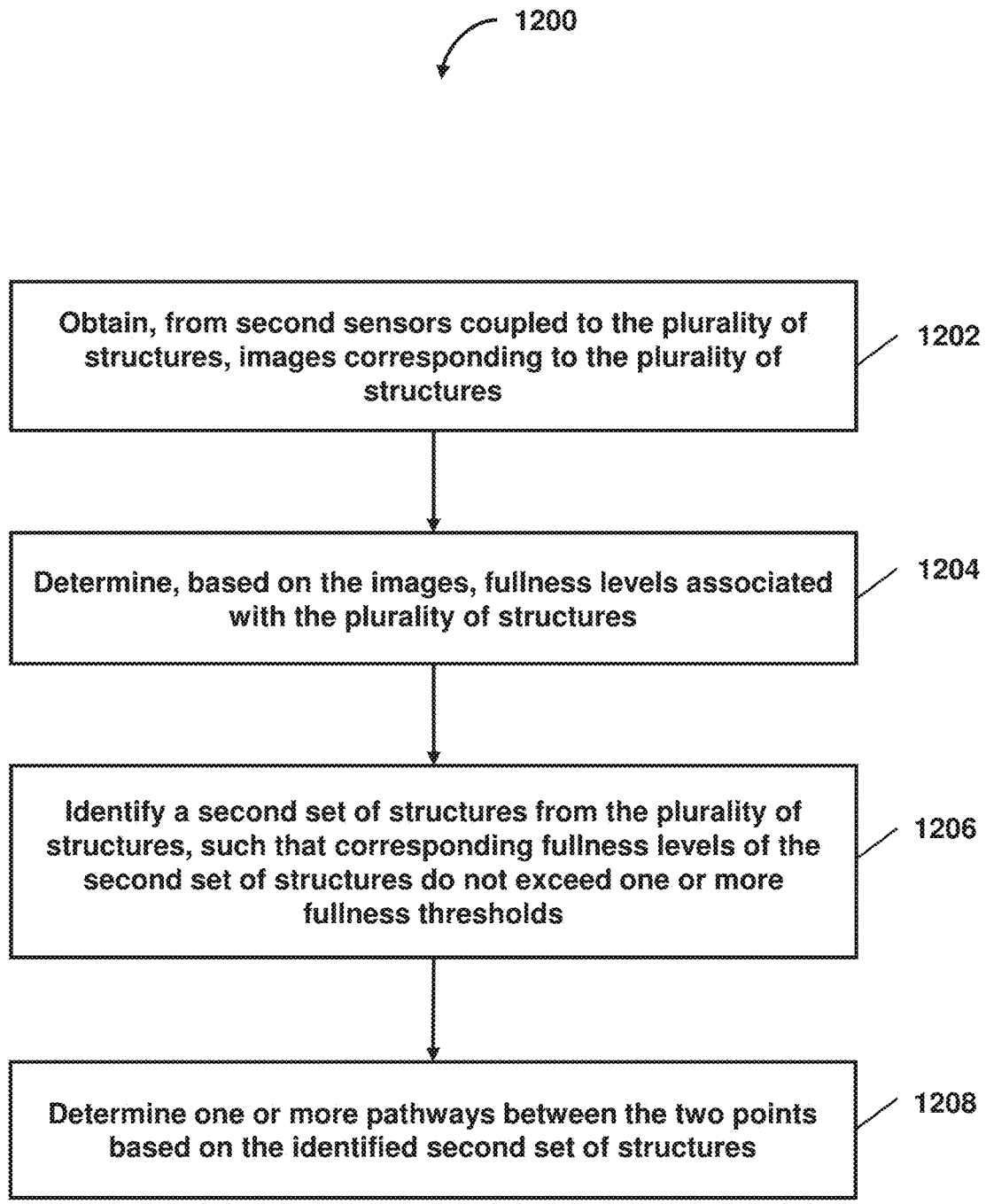
FIG. 12 shows a flowchart of a method for determining one or more pathways between two points in an infrastructure based on fullness thresholds, in accordance with one or more embodiments.

FIGS. 11 and 12 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods.

FIG. 11 shows a flowchart 1100 of a method for determining one or more pathways between two points in an infrastructure based on weight thresholds, in accordance with one or more embodiments. In an operation 1102, a selection of two points within an infrastructure may be obtained via a user interface (e.g., user interaction subsystem 116). In an operation 1104, pathways between the two points may be identified. In some embodiments, the pathways may include a plurality of structures (e.g., cable trays). In some embodiments, the pathways may be identified as the shortest, most optimal, or most cost-efficient pathways connecting the two points. In some embodiments, the pathways may be identified based on other criteria.

In an operation 1106, weights associated with the plurality of structures included in the pathways may be obtained. In some embodiments, the weights may be obtained from first sensors coupled to the plurality of structures. In an operation 1108, a first set of structures may be identified out of the plurality of structures. In some embodiments, the first set of structures may have corresponding weights that do not exceed one or more weight thresholds. In some embodiments, the weight thresholds may depend on the type and size of the structures and contents of the structures.

In an operation 1110, one or more pathways between the two points may be determined based on the identified first set of structures. For example, the one or more pathways may be connections between the two points for which all structures included in the one or more pathways belong to the identified first set of structures. In some embodiments, the one or more pathways may be based on additional criteria.

FIG. 12 shows a flowchart 1200 of a method for determining one or more pathways between two points in an infrastructure based on fullness thresholds, in accordance with one or more embodiments. In an operation 1202, images corresponding to a plurality of structures may be obtained. In some embodiments, the images may be obtained from second sensors coupled to the plurality of structures. In some embodiments, the plurality of structures may be structures included in the pathways identified in operation 1104, as shown in FIG. 11. In some embodiments, the plurality of structures may be structures included in the first set of structures identified in operation 1108, as shown in FIG. 11. In some embodiments, the plurality of structures may be a different plurality of structures. In an operation 1204, fullness levels associated with the plurality of structures may be determined. In some embodiments, the fullness levels may be determined based on processing of the images of the plurality of structures.

In an operation 1206, a second set of structures may be identified from the plurality of structures. In some embodiments, the second set of structures may have corresponding fullness levels that do not exceed one or more fullness thresholds. In some embodiments, the fullness thresholds may depend on the type and size of the structures and contents of the structures. In an operation 1208, one or more pathways between the two points may be determined based on the identified second set of structures. For example, the one or more pathways may be connections between the two points for which all structures included in the one or more pathways belong to the identified second set of structures. In some embodiments, the one or more pathways may be based on additional criteria.

In some embodiments, the various computers and subsystems illustrated in FIG. 1 may include one or more computing devices that are programmed to perform the functions described herein. The computing devices may include one or more electronic storages (e.g., database(s) 132), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, or firmware components operating together. For example, the computing devices may be implemented by a cloud of computing platforms operating together as the computing devices.

The electronic storages may include non-transitory, computer-readable media that electronically stores information. The media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. The electronic storages may include one or more virtual storage resources (e.g., cloud storage, a virtual private network, or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118, 142-146, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 and 142-146 described herein is for illustrative purposes, and is not intended to be limiting, as any of subsystems 112-118 and 142-146 may provide more or less functionality than is described. For example, one or more of subsystems 112-118 and 142-146 may be eliminated, and some or all of its functionality may be provided by other ones of subsystems 112-118 and 142-146. As another example, additional subsystems may be programmed to perform some or all of the functionality attributed herein to one of subsystems 112-118 and 142-146.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: identifying pathways between two points, the pathways including a plurality of structures; obtaining, from first sensors coupled to the plurality of structures, weights associated with the plurality of structures; identifying a first set of structures from the plurality of structures, such that corresponding weights of the first set of structures do not exceed one or more weight thresholds; and determining one or more first pathways between the two points based on the identified first set of structures.

2. The method of embodiment 1, further comprising obtaining, via a user interface, a selection of the two points within an infrastructure.

3. The method of any of embodiments 1-2, further comprising presenting, via the user interface, the one or more first pathways between the two points.

4. The method of any of embodiments 1-3, wherein the one or more weight thresholds associated with the plurality of structures are based on a size or type of the plurality of structures.

5. The method of any of embodiments 1-4, further comprising: determining that a weight associated with a structure of the plurality of structures has exceeded a weight threshold associated with the structure; and presenting, via the user interface, an indication that the weight associated with the structure has exceeded the weight threshold associated with the structure.

6. The method of embodiment 5, further comprising sending a command to generate an alert at the structure.

7. The method of any of embodiments 1-6, further comprising: obtaining, from second sensors coupled to the plurality of structures, images corresponding to the plurality of structures; determining, based on the images, fullness levels associated with the plurality of structures; identifying a second set of structures from the plurality of structures, such that corresponding fullness levels of the second set of structures do not exceed one or more fullness thresholds; and determining one or more second pathways between the two points based on the identified second set of structures.

8. The method of embodiment 7, further comprising: identifying a set of pathways belonging to both the one or more first pathways and the one or more second pathways; obtaining, via the user interface, a selection of a pathway belonging to the identified set of pathways; and sending a command to generate a visual indication along the selected pathway.

9. The method of embodiment 8, further comprising: determining that a fullness level associated with a structure of the plurality of structures has exceeded a fullness threshold associated with the structure; and presenting, via the user interface, an indication that the fullness level of the structure has exceeded the fullness threshold associated with the structure.

10. A tangible, non-transitory, computer-readable medium storing instructions that, when executed by a data processing apparatus, cause the data processing apparatus to perform operations comprising those of any of embodiments 1-9.

11. A system comprising: one or more processors; and memory storing instructions that, when executed by the processors, cause the processors to effectuate operations comprising those of any of embodiments 1-9.

What is claimed is:

1. A method comprising:
    obtaining, via a user interface, a selection of two points within an infrastructure;
    identifying pathways between the two points, the pathways including a plurality of structures;
    obtaining, from sensors coupled to the plurality of structures, weights associated with the plurality of structures and fullness levels associated with the plurality of structures;
    identifying, based on one or more weight thresholds and one or more fullness thresholds, a set of structures from the plurality of structures, such that corresponding weights of the set of structures do not exceed the one or more weight thresholds and the corresponding fullness levels of the set of structures do not exceed the one or more fullness thresholds; and
    determining one or more pathways between the two points based on the identified first set of structures.

2. The method of claim 1, further comprising presenting, via the user interface, the one or more pathways between the two points.

3. The method of claim 1, wherein the one or more weight thresholds associated with the plurality of structures are based on a size or type of the plurality of structures.

4. The method of claim 1, further comprising:
determining that a weight associated with a structure of the plurality of structures has exceeded a weight threshold associated with the structure; and
presenting, via the user interface, an indication that the weight associated with the structure has exceeded the weight threshold associated with the structure.

5. The method of claim 1, wherein the plurality of structures comprises a plurality of cable trays to which the sensors are coupled.

6. The method of claim 1, further comprising:
sending, based on the identified set of structures that do not exceed the one or more weight thresholds and do not exceed the one or more fullness thresholds, a command to generate haptic feedback to occur along the one or more pathways.

7. The method of claim 1, wherein obtaining the fullness levels associated with the plurality of structures comprises:
obtaining, from first sensors of the sensors coupled to the plurality of structures, images corresponding to the plurality of structures; and
determining, based on the images, the fullness levels associated with the plurality of structures.

8. The method of claim 7, further comprising:
determining that a fullness level associated with a structure of the plurality of structures has exceeded a fullness threshold associated with the structure; and
presenting, via the user interface, an indication that the fullness level of the structure has exceeded the fullness threshold associated with the structure.

9. The method of claim 1, further comprising:
sending, based on the identified set of structures that do not exceed the one or more weight thresholds and do not exceed the one or more fullness thresholds, one or more commands that simultaneously generate first visual indications along the one or more pathways and second visual indications along one or more other pathways, the second visual indications being configured to have a different color than the first visual indications.

10. A non-transitory, computer-readable medium storing instructions that, when executed by one or more processors, cause operations comprising:
obtaining, via a user interface, a selection of two points within an infrastructure;
identifying pathways between the two points, the pathways including a plurality of structures;
obtaining, from sensors coupled to the plurality of structures, weights associated with the plurality of structures and fullness levels associated with the plurality of structures;
identifying, based on one or more weight thresholds and one or more fullness thresholds, a set of structures from the plurality of structures, such that corresponding weights of the set of structures do not exceed the one or more weight thresholds and the corresponding fullness levels of the set of structures do not exceed the one or more fullness thresholds; and
determining one or more pathways between the two points based on the identified set of structures.

11. The non-transitory, computer-readable medium of claim 10, wherein the operations further comprise presenting, via the user interface, the one or more pathways between the two points.

12. The non-transitory, computer-readable medium of claim 10, wherein the one or more weight thresholds associated with the plurality of structures are based on a size or type of the plurality of structures.

13. The non-transitory, computer-readable medium of claim 10, the operations further comprising:
determining that a weight associated with a structure of the plurality of structures has exceeded a weight threshold associated with the structure; and
presenting, via the user interface, an indication that the weight associated with the structure has exceeded the weight threshold associated with the structure.

14. The non-transitory, computer-readable medium of claim 10, wherein the plurality of structures comprises a plurality of cable trays to which the sensors are coupled.

15. The non-transitory, computer-readable medium of claim 10, wherein obtaining the fullness levels associated with the plurality of structures comprises:
obtaining, from first sensors of the sensors coupled to the plurality of structures, images corresponding to the plurality of structures; and
determining, based on the images, the fullness levels associated with the plurality of structures.

16. The non-transitory, computer-readable medium of claim 15, the operations further comprising:
determining that a fullness level associated with a structure of the plurality of structures has exceeded a fullness threshold associated with the structure; and
presenting, via the user interface, an indication that the fullness level of the structure has exceeded the fullness threshold associated with the structure.

17. The non-transitory, computer-readable medium of claim 10, the operations further comprising:
sending, based on the identified set of structures that do not exceed the one or more weight thresholds and do not exceed the one or more fullness thresholds, one or more commands that simultaneously generate first visual indications along the one or more pathways and second visual indications along one or more other pathways, the second visual indications being configured to have a different color than the first visual indications.

18. A system comprising:
a computer system comprising one or more processors programmed with computer program instructions that, when executed, cause operations comprising:
obtaining, via a user interface, a selection of two points within an infrastructure;
identifying pathways between the two points, the pathways including a plurality of structures;
obtaining, from sensors coupled to the plurality of structures, weights associated with the plurality of structures and fullness levels associated with the plurality of structures;
identifying, based on one or more weight thresholds and one or more fullness thresholds, a set of structures from the plurality of structures, such that corresponding weights of the set of structures do not exceed the one or more weight thresholds and the corresponding fullness levels of the set of structures do not exceed the one or more fullness thresholds; and
determining one or more pathways between the two points based on the identified set of structures.

19. The system of claim 18, wherein obtaining the fullness levels associated with the plurality of structures comprises:

obtaining, from first sensors of the sensors coupled to the plurality of structures, images corresponding to the plurality of structures; and determining, based on the images, the fullness levels associated with the plurality of structures.

20. The system of claim 18, the operations further comprising:

sending, based on the identified set of structures that do not exceed the one or more weight thresholds and do not exceed the one or more fullness thresholds, one or more commands that simultaneously generate first visual indications along the one or more pathways and second visual indications along one or more other pathways, the second visual indications being configured to have a different color than the first visual indications.

21. The system of claim 18, wherein the plurality of structures comprises a plurality of cable trays to which the sensors are coupled.

* * * * *